(12) United States Patent
Bisson et al.

(10) Patent No.: US 12,404,780 B2
(45) Date of Patent: Sep. 2, 2025

(54) CONTAINMENT RING FOR GAS TURBINE ENGINE

(71) Applicant: Pratt & Whitney Canada Corp., Québec (CA)

(72) Inventors: Jocelyn Bisson, Québec (CA); Jagdeep Singh Jhinger, Québec (CA); Guy Lefebvre, Québec (CA)

(73) Assignee: PRATT & WHITNEY CANADA CORP., Québec (CA)

( * ) Notice: Subject to any disclaimer, the term of this patent is extended or adjusted under 35 U.S.C. 154(b) by 0 days.

(21) Appl. No.: 18/425,993

(22) Filed: Jan. 29, 2024

(65) Prior Publication Data
US 2025/0243778 A1     Jul. 31, 2025

(51) Int. Cl.
  *F01D 21/04* (2006.01)
  *F01D 25/24* (2006.01)
  *F02C 7/00* (2006.01)

(52) U.S. Cl.
  CPC ......... *F01D 21/045* (2013.01); *F01D 25/243* (2013.01); *F02C 7/00* (2013.01)

(58) Field of Classification Search
  CPC .................................................. F01D 21/045
  See application file for complete search history.

(56) References Cited

U.S. PATENT DOCUMENTS

| | | |
|---|---|---|
| 423,452 A | 3/1890 | Snyder |
| 1,166,820 A | 1/1916 | Doherty |
| 4,639,188 A | 1/1987 | Swadley |
| 5,259,724 A | 11/1993 | Liston et al. |
| 6,059,523 A * | 5/2000 | Modafferi ............. F01D 21/045 415/196 |
| 6,206,631 B1 | 3/2001 | Schilling |
| 6,575,694 B1 * | 6/2003 | Thompson ............ F01D 21/045 415/200 |
| 6,637,186 B1 | 10/2003 | Van |
| 7,874,136 B2 | 1/2011 | Heyerman |
| 10,533,450 B2 | 1/2020 | Kling et al. |
| 10,731,662 B2 | 8/2020 | Crutchfield |

(Continued)

FOREIGN PATENT DOCUMENTS

| | | |
|---|---|---|
| EP | 1073828 B1 | 6/2004 |
| EP | 3090148 B1 | 5/2021 |

OTHER PUBLICATIONS

Extended European Search Report for EP Application No. 25154762.6; Mailing date, Jun. 17, 2025, 7 pages.

*Primary Examiner* — Andrew H Nguyen
(74) *Attorney, Agent, or Firm* — CANTOR COLBURN LLP

(57) ABSTRACT

A containment ring for a turbine casing assembly, including: a main body portion, the main body portion having an outer periphery and an inner periphery and a forward end and an aft end each extending between the outer periphery and the inner periphery, the main body portion also including an outer containment zone and an inner containment zone, the inner containment zone is integrally formed with the outer containment zone in order to provide a single unitary structure and the inner containment zone being radially inward from the outer containment zone, the inner containment zone extending radially outward from the inner periphery and having a plurality of ribs extending between the forward end and the aft end.

13 Claims, 5 Drawing Sheets

(56) References Cited

U.S. PATENT DOCUMENTS

| | | |
|---|---|---|
| 11,008,887 B2 | 5/2021 | Hall et al. |
| 11,015,482 B2 | 5/2021 | Kasal et al. |
| 11,549,442 B2 | 1/2023 | Asdev et al. |
| 11,668,205 B2 | 6/2023 | Guymon et al. |
| 11,698,001 B2 | 7/2023 | Kasal et al. |
| 11,821,326 B2 | 11/2023 | Vanapalli et al. |
| 2014/0212273 A1 | 7/2014 | Le Borgne |
| 2014/0271157 A1* | 9/2014 | Harper .................. F04D 17/00 415/186 |
| 2016/0273380 A1 | 9/2016 | Stiehler et al. |
| 2016/0341075 A1 | 11/2016 | Liu et al. |
| 2017/0175560 A1 | 6/2017 | Merrill et al. |
| 2020/0165936 A1* | 5/2020 | Kasal .................. B22F 10/00 |
| 2021/0301728 A1* | 9/2021 | Nayak .................. F02C 7/277 |

* cited by examiner

CONTAINMENT RING FOR GAS TURBINE ENGINE

BACKGROUND

This disclosure relates to structures for use in gas turbine engines, and more particularly to a containment ring for use in a gas turbine engine.

Gas turbine engines have a turbine casing assembly. The turbine casing assembly may include a containment ring. It is desirable to reduce the weight of the containment ring while maintaining its performance.

BRIEF DESCRIPTION

Disclosed is a containment ring for a turbine casing assembly, including: a main body portion, the main body portion having an outer periphery and an inner periphery and a forward end and an aft end each extending between the outer periphery and the inner periphery, the main body portion also including an outer containment zone and an inner containment zone, the inner containment zone is integrally formed with the outer containment zone in order to provide a single unitary structure and the inner containment zone being radially inward from the outer containment zone, the inner containment zone extending radially outward from the inner periphery and having a plurality of ribs extending between the forward end and the aft end.

In addition to one or more of the features described above, or as an alternative to any of the foregoing embodiments, the plurality of ribs are equally spaced from each other.

In addition to one or more of the features described above, or as an alternative to any of the foregoing embodiments, the plurality of ribs are angularly offset with respect to an inner axis of the containment ring.

In addition to one or more of the features described above, or as an alternative to any of the foregoing embodiments, the plurality of ribs are angularly offset at angle with respect to an inner axis of the containment ring, the angle being within a range of 20 degrees to 70 degrees with respect to an inner axis of the containment ring.

In addition to one or more of the features described above, or as an alternative to any of the foregoing embodiments, the plurality of ribs are angularly offset at a 45 degree angle with respect to an inner axis of the containment ring.

In addition to one or more of the features described above, or as an alternative to any of the foregoing embodiments, the containment ring further including a flange portion secured to the main body portion.

In addition to one or more of the features described above, or as an alternative to any of the foregoing embodiments, the flange portion is secured to the main body portion via a plurality of tabs.

In addition to one or more of the features described above, or as an alternative to any of the foregoing embodiments, the main body portion is circular in shape.

In addition to one or more of the features described above, or as an alternative to any of the foregoing embodiments, the plurality of ribs are each separated by an opening.

In addition to one or more of the features described above, or as an alternative to any of the foregoing embodiments, the opening does not extend to the outer periphery or the forward end or the aft end.

In addition to one or more of the features described above, or as an alternative to any of the foregoing embodiments, the opening extends from the inner periphery and has a scalloped shape.

In addition to one or more of the features described above, or as an alternative to any of the foregoing embodiments, the opening has an inner surface that is furthest from the inner periphery at a central portion of the opening and a depth of the opening from the inner periphery gradually decreases as it extends from the central portion towards the forward end or the aft end.

In addition to one or more of the features described above, or as an alternative to any of the foregoing embodiments, the opening has a curved bottom surface that extends from the central portion towards the forward end and aft end of the main body portion.

In addition to one or more of the features described above, or as an alternative to any of the foregoing embodiments, an axial length of the inner periphery from the forward end to the aft end is greater than an axial length of the outer periphery from the forward end to the aft end.

In addition to one or more of the features described above, or as an alternative to any of the foregoing embodiments, the main body portion has a trapezoidal shape in its cross section.

In addition to one or more of the features described above, or as an alternative to any of the foregoing embodiments, the forward end and the aft end are angled surfaces that extend towards each other from the inner periphery.

Also disclosed is a turbine casing assembly, including: an outer structural case; and a containment ring, including: a main body portion, the main body portion having an outer periphery and an inner periphery and a forward end and an aft end each extending between the outer periphery and the inner periphery, the main body portion also including an outer containment zone and an inner containment zone, the inner containment zone is integrally formed with the outer containment zone in order to provide a single unitary structure and the inner containment zone being radially inward from the outer containment zone, the inner containment zone extending radially outward from the inner periphery and having a plurality of ribs extending between the forward end and the aft end.

In addition to one or more of the features described above, or as an alternative to any of the foregoing embodiments, the inner containment zone is integrally formed with the outer containment zone in order to provide a single unitary structure and the plurality of ribs are angularly offset with respect to an inner axis of the containment ring.

In addition to one or more of the features described above, or as an alternative to any of the foregoing embodiments, the plurality of ribs are angularly offset at angle with respect to an inner axis of the containment ring, the angle being within a range of 20 degrees to 70 degrees with respect to an inner axis of the containment ring and the plurality of ribs are each separated by an opening.

Also disclosed is a gas turbine engine, including: a compressor section; a combustor; a turbine section; and a turbine casing assembly, including: an outer structural case; and a containment ring, including: a main body portion, the main body portion having an outer periphery and an inner periphery and a forward end and an aft end each extending between the outer periphery and the inner periphery, the main body portion also including an outer containment zone and an inner containment zone, the inner containment zone is integrally formed with the outer containment zone in order to provide a single unitary structure and the inner containment zone is radially inward from the outer containment zone, the inner containment zone extending radially outward from the inner periphery and having a plurality of ribs extending between the forward end and the aft end.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the FIGS.

Figure 1:
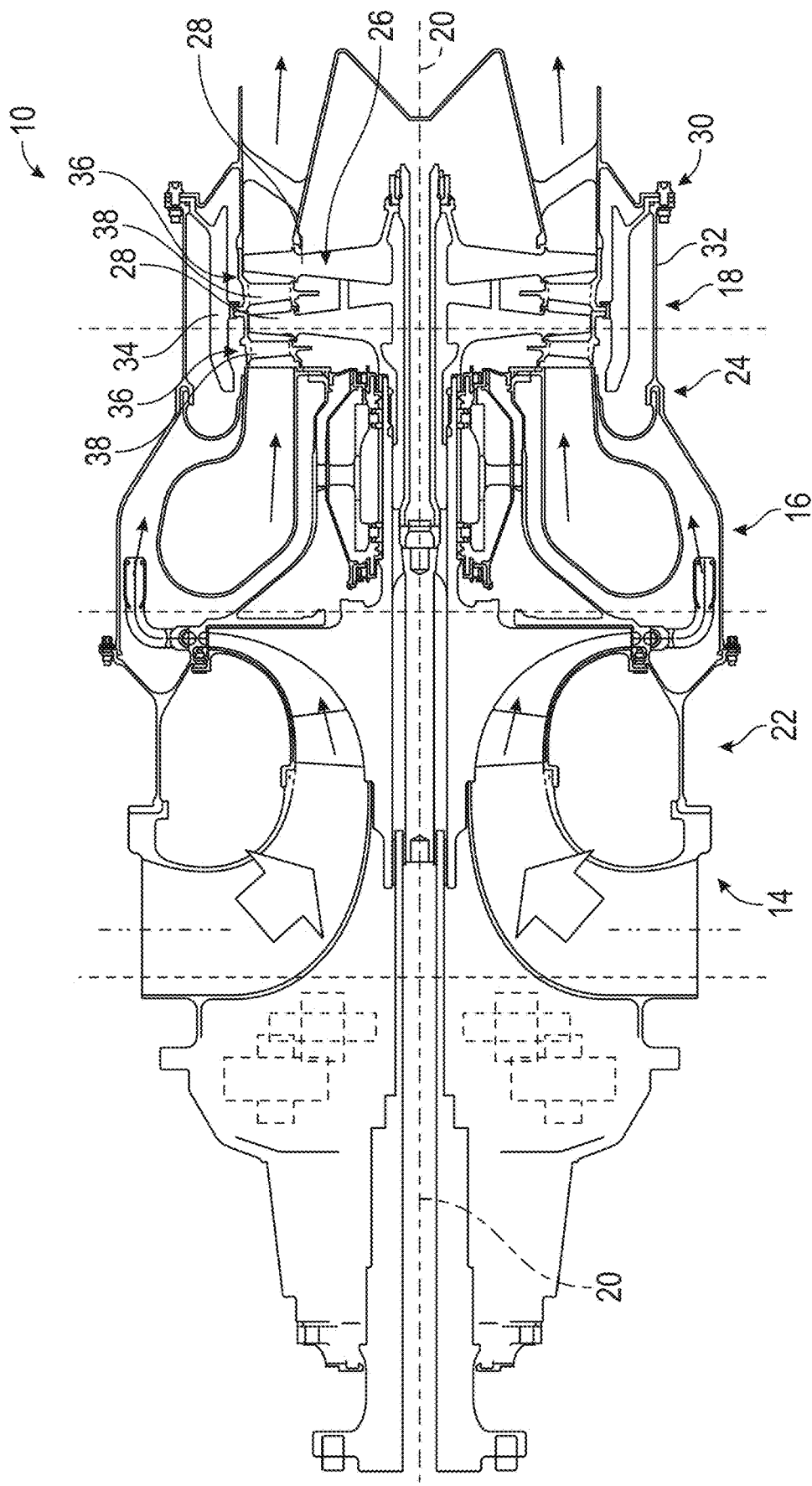
FIG. 1 is a schematic cross-sectional view of a gas turbine engine.

FIG. 1 illustrates a gas turbine engine 10, generally comprising in serial flow communication a compressor section 14 for pressurizing the air, a combustor section 16 in which the compressed air is mixed with fuel and ignited for generating an annular stream of hot combustion gases, and a turbine section 18 for extracting energy from the combustion gases. Some of the rotatable components of the gas turbine engine 10 rotate about a longitudinal center axis 20 of the gas turbine engine 10.

The gas turbine engine 10 has a "cold" section 22 and a "hot" section 24. The cold section 22 includes those components of the gas turbine engine 10 which are upstream (relative to the direction gases flow through the gas turbine engine 10) of the combustor 16 and have thus not been exposed to the hot combustion gases. The hot section 24 includes the combustor 16 and those components of the gas turbine engine 10 which are downstream of the combustor 16. The components of the hot section 24 are thus exposed to the hot combustion gases generated in the combustor 16. The gases flowing through the cold section 22 have a lower temperature than the gases flowing through the hot section 24.

The hot section 24 includes the combustor 16, the turbine section 18 and a case downstream of the turbine section 18 for conveying the exhaust gases. The turbine section 18 includes one or more rotors 26 each having a plurality of rotor blades 28 secured to a hub 29 which rotates about the center axis 20 and extract energy from the combustion gases. In one implementation the turbine blades 28 are integrally formed with the hub 29 in order to form a single component referred to as an integrally bladed rotor or IBR 26. The hot section 24 includes stationary bodies which enclose other components of the hot section 24 and define the gas path for the hot combustion gases. These stationary bodies are sometimes referred to as casings or cases which collectively define radially-outer boundaries of the gas turbine engine 10.

Referring now to at least FIGS. 1-7, the casing of the gas turbine engine 10 includes a turbine casing assembly 30 which is part of the hot section 24. The turbine casing assembly 30 is a group of casing components that form part of the turbine section 18 and enclose the combustion gases. The turbine casing assembly 30 may be provided as disassembled components which may then be assembled in a suitable facility. The turbine casing assembly 30 includes an outer structural case 32, a containment ring 34, and at least one vane ring 36. The at least one vane ring 36 having at least one vane 38 secured thereto. In one embodiment, the least one vane ring 36 having the at least one vane 38 may be formed as a single component.

In one embodiment, the outer structural case 32, the containment ring 34, and the least one vane ring 36 have circular portions or configurations.

Figure 3:
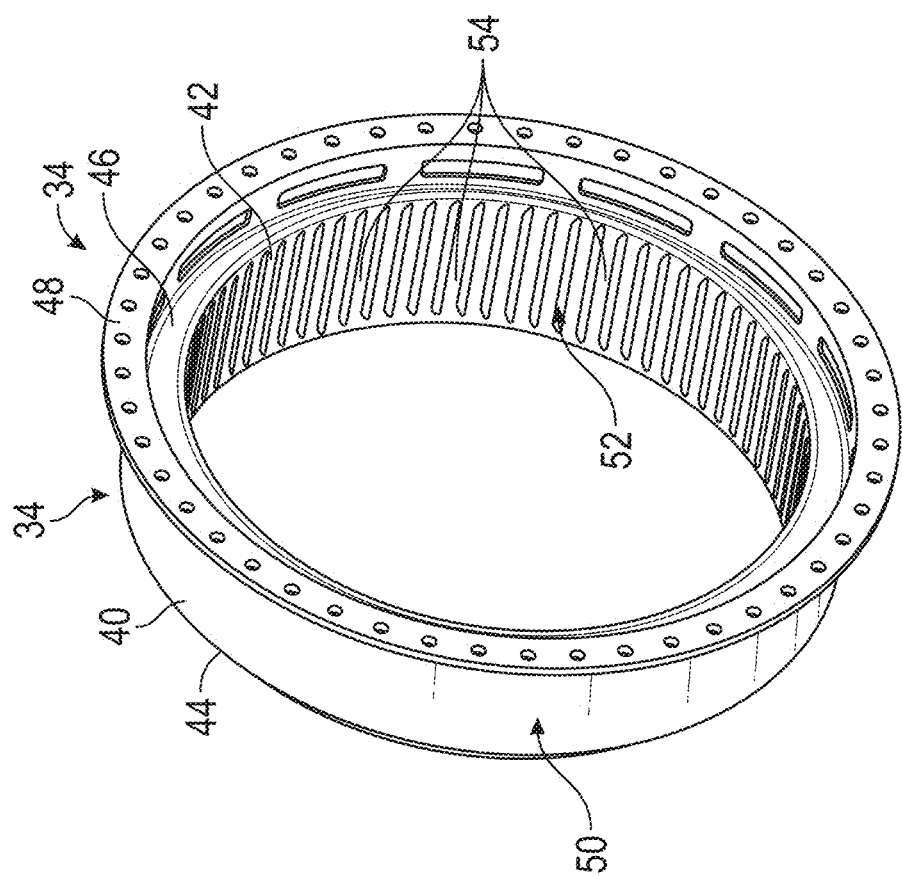
FIG. 3 is a perspective view of a containment ring in accordance with the present disclosure.
Figure 2:
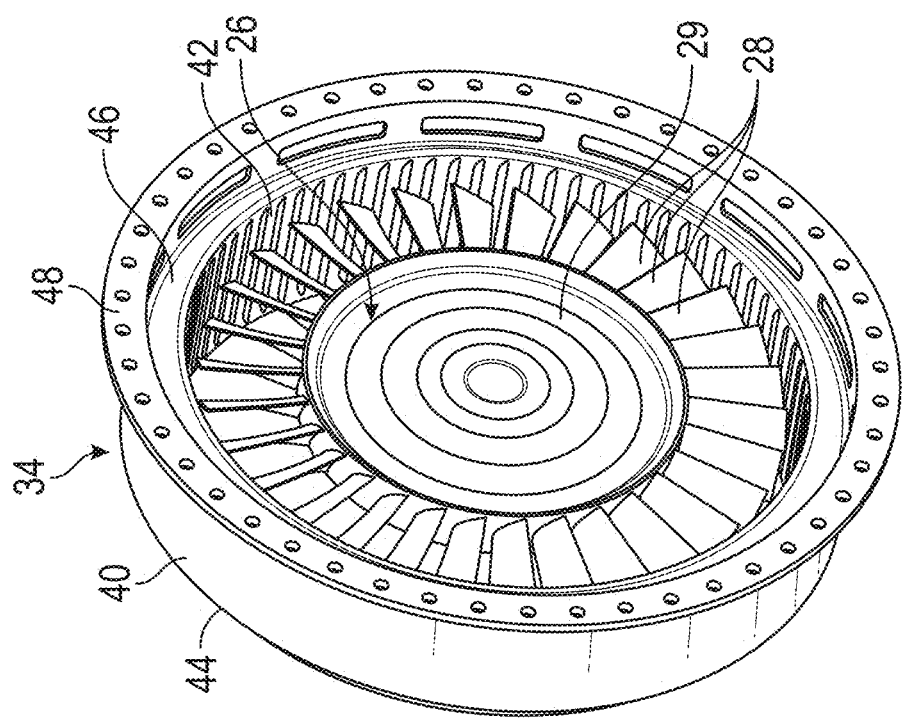
FIG. 2 is a perspective view of a containment ring and a rotor in accordance with the present disclosure.
Figure 5:
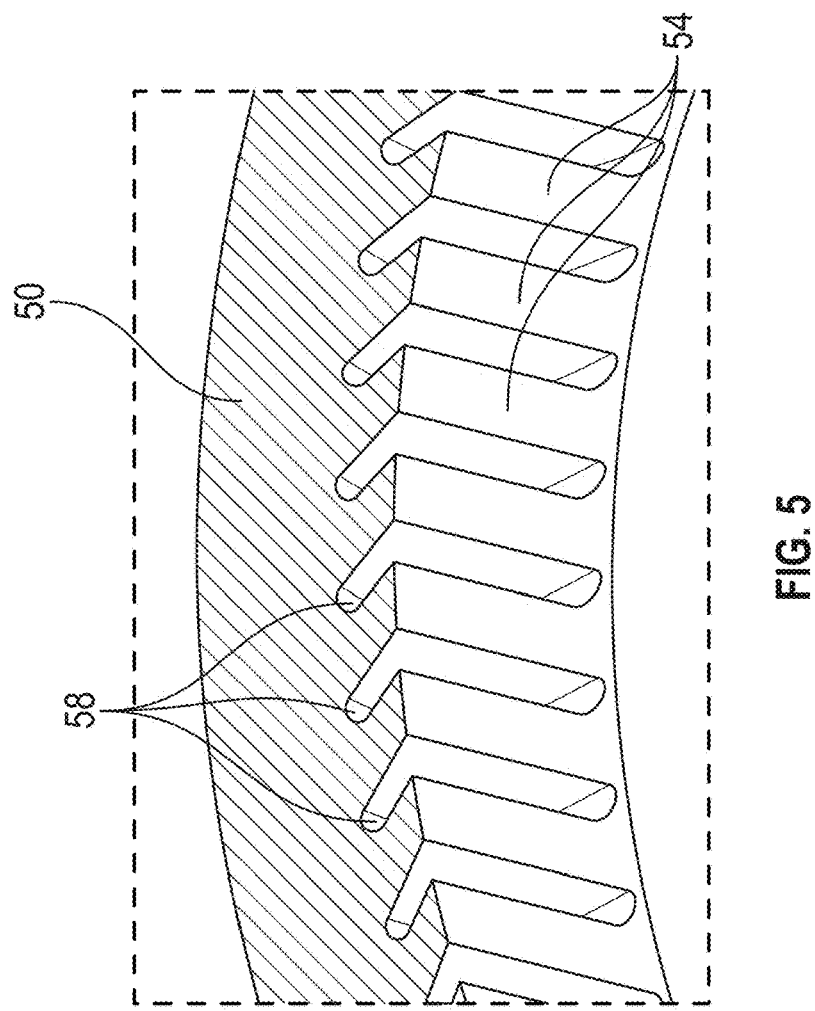
FIG. 5 is an enlarged perspective cross-sectional view of a portion of the containment ring in accordance with the present disclosure.
Figure 4:
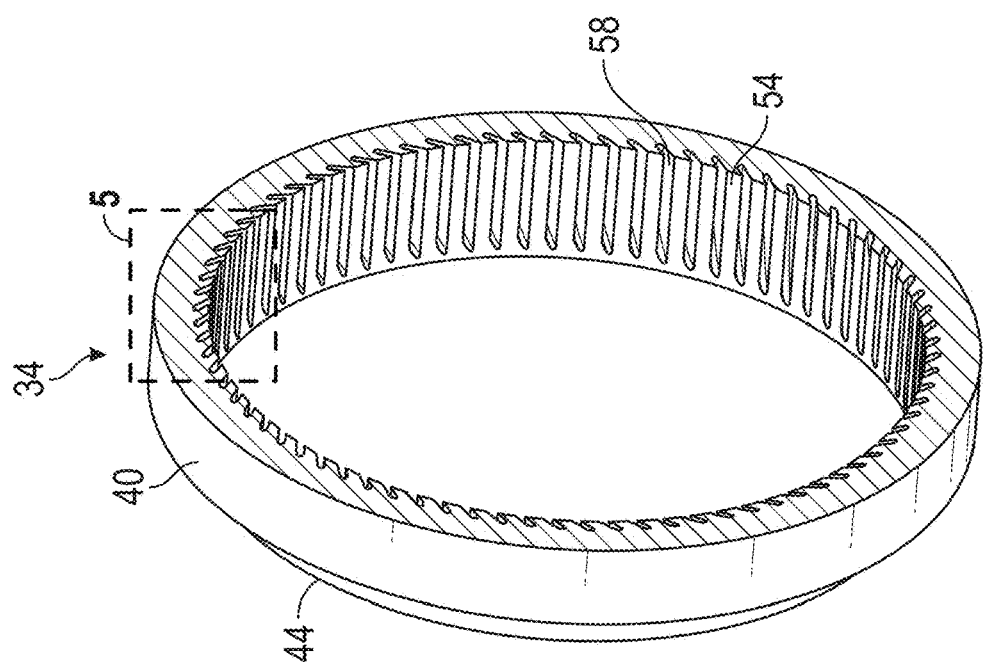
FIG. 4 is a perspective cross-sectional view of a containment ring in accordance with the present disclosure.

FIG. 2 is a perspective view of a containment ring 34 and rotor 26 in accordance with the present disclosure and FIG. 3 is a perspective view of the containment ring 34 in accordance with the present disclosure. FIG. 4 is a perspective cross-sectional view of the containment ring 34 and FIG. 5 is an enlarged perspective cross-sectional view of a portion of the containment ring 34 in accordance with the present disclosure.

The containment ring 34 has a main body portion 39. The main body portion 39 having an outer periphery 40, an inner periphery 42, a forward end 44 and an aft end 46. As used herein, the outer periphery 40 is radially outward from the inner periphery 42. In addition, and when the containment ring is installed in the engine 10, the outer periphery 40 is radially further from the central axis 20 than the inner periphery 42. The containment ring 34 also has a flange portion 48, that is configured to secure the containment ring 34 to the outer structural case 32. The flange portion 48 being secured to the main body portion 39. In one non-limiting embodiment, the containment rings 34 and/or the flange portion 48 may be formed from nickel based alloys or any other suitable material.

In addition, the containment ring 34 also has an outer portion or outer containment zone 50 and an inner portion or inner containment zone 52. While two zones 50 and 52 are mentioned it is understood that zones 50 and 52 are contiguous or in other words zones 50 and 52 are part of a single unitary structure comprising at least the main body portion 39. The outer portion or outer containment zone 50 being radially outward from the inner portion or inner containment zone 52 and the outer portion or outer containment zone 50 being integrally formed with the inner portion or inner containment zone 52 such that the containment ring 34 is a single unitary structure with the outer portion or outer containment zone 50 and the inner portion or inner containment zone 52.

The inner portion or inner containment zone 52 of the containment ring 34 includes a plurality of equally spaced ribs 54 oriented at an angle offset from the axis of rotation 20. It is also understood and in another embodiment, that the ribs 54 could also be unequally spaced from each other. In one embodiment, the ribs 54 are angularly offset at angle with respect to an inner axis of the containment ring, the angle being within a range of 20 degrees to 70 degrees with respect to an inner axis of the containment ring. Of course, other ranges greater or less the 20 degrees to 70 degrees with respect to an inner axis of the containment ring are considered to be within the scope of various embodiments of the present disclosure. In one further non-limiting embodiment, the ribs 54 are angled at 45 degrees with respect to the axis of rotation 20. Of course, other angles greater or less than 45 degrees with respect to the axis of rotation 20 are considered to be within the scope of various embodiments of the present disclosure. This configuration of the inner portion or inner containment zone 52 is designed to absorb the kinetic energy of disc fragments 56 in the event of a tri-hub fracture event. For example, in the event the rotor 26 has separated into fragments illustrated in FIG. 8 the fragments will contact some of the ribs 54 and the ribs 54 will deflect radially outward due to their angular configuration and a plurality of openings 58 located between each of the ribs 54. As such, the deflection of the ribs 54 and an openings 58 will create pockets during absorption of the kinetic energy of the fragments into the containment ring 34. Note the description of a tri-hub fracture event is merely provided as an example and various embodiments of the present disclosure are not limited to this specific event. By providing a plurality of ribs 54 in the inner portion or inner containment zone 52, the ribs 54 through their kinetic energy absorption reduces the impact force applied to the solid outer portion or outer containment zone 50. As such, a thickness of the outer portion or outer containment zone 50 can be reduced while still providing the required containment. This reduction in thickness allows for a reduction in weight of the containment ring 34 which is desirable in the gas turbine engine 10.

As such, the outer portion or outer containment zone 50 is solid while the inner portion or inner containment zone 52 includes the ribs 54 and the outer portion or outer containment zone 50 of the containment ring 34 is considerably reduced in thickness, reducing the weight of the engine 10 while still containing the rotor fragments 56.

Figure 6:
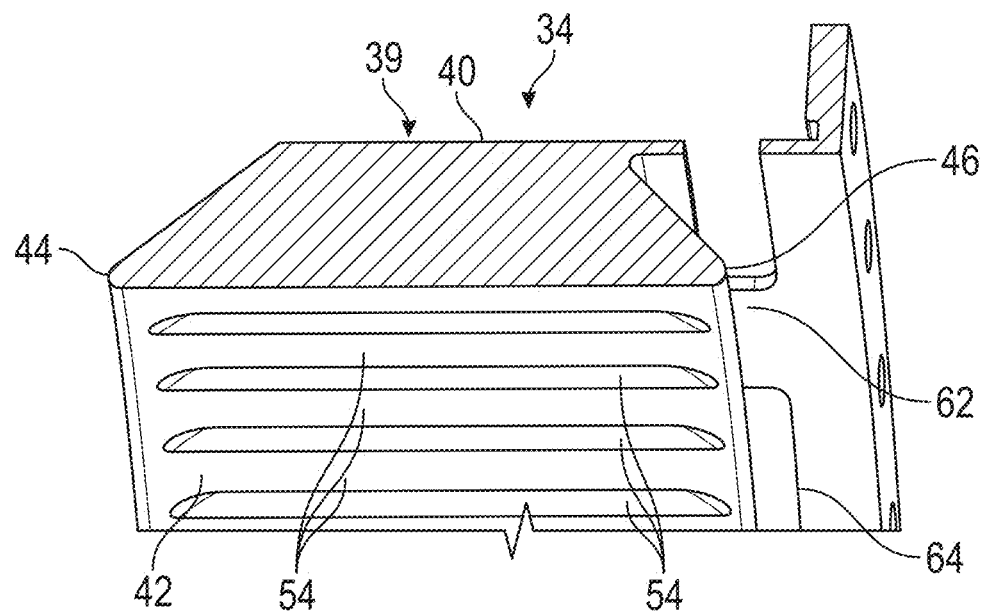
FIG. 6 is cross-sectional view of the containment ring in accordance with the present disclosure.
Figure 7:
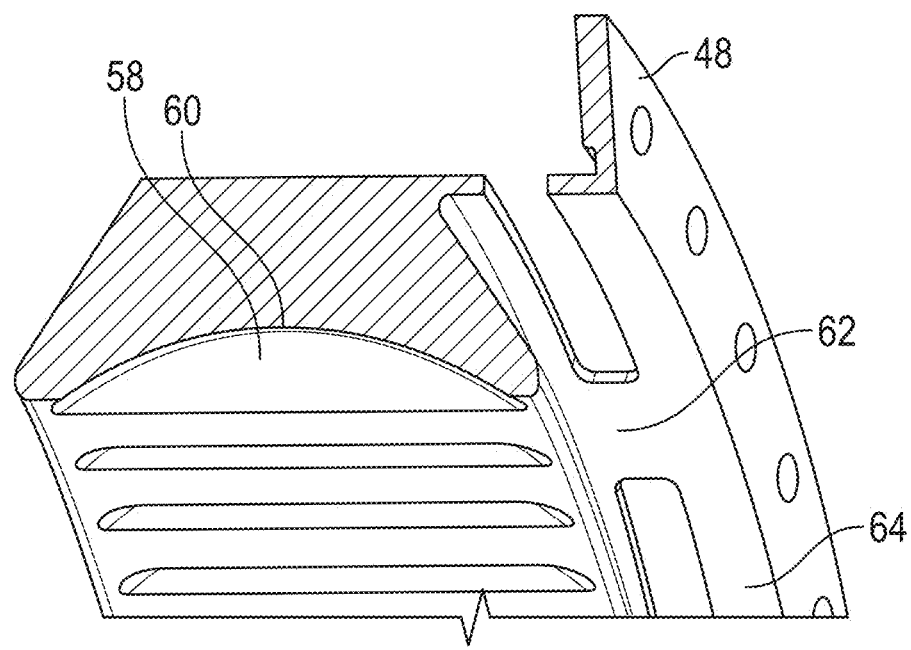
FIG. 7 is another cross-sectional view of the containment ring in accordance with the present disclosure.

As mentioned above a plurality of openings 58 are located between each of the plurality of ribs 54. FIGS. 6 and 7 are cross-sectional views of the containment ring 34 in a direction transverse or orthogonal with respect to the cross sectional views illustrated in FIGS. 4 and 5. FIG. 6 being a cross-sectional view across of one of the ribs 54 and FIG. 7 is a cross-sectional across one of the openings 58.

As illustrated, the plurality of openings 58 do not extend all the way through the forward end 44 and aft end 46 of the containment ring 34. Nor do these openings 58 extend to the outer periphery 40. In other words, the openings 58 only extend from or open into the inner periphery 42. In addition, and in one embodiment, the plurality of openings 58 are scalloped shaped such that each opening 58 has an inner or bottom surface at its greatest depth from the inner periphery 42 at a mid portion or central portion 60 of the opening 58. In this embodiment, the depth of each opening 58 gradually decreases as it extends from the mid portion or central portion 60 towards the forward end 44 and aft end 46 of the containment ring 34. In other words and in one embodiment, each opening 58 has a curved bottom surface that extends from the mid portion or central portion 60 towards the forward end 44 and aft end 46 of the containment ring 34. Of course, other configurations may be employed for openings 58.

In one non-limiting embodiment and shown in FIGS. 6 and 7, an axial length of the inner periphery 42 from the forward end 44 to the aft end 46 is greater than an axial length of the outer periphery 40 from the forward end 44 to the aft end 46 such that the main body portion 49 of the containment ring 34 has a trapezoidal shape in its cross-section or in other words the forward end 44 and the aft end 46 are angled surfaces that extend towards each other from the inner periphery 42. As such, the inner periphery 42 has a greater surface area than the outer periphery 40. Of course, other configurations are of the cross-sectional shape of the containment ring 34 are considered to be within the scope of the present disclosure. Non-limiting examples include rectangular, square, any equivalents thereof, etc.

Also shown is that the flange portion 48 of the containment ring 34 is secured to the main body portion 39 via a plurality of tabs 62. In one embodiment, the tabs 62 are separated from each other by a plurality of openings 64. In one embodiment, the tabs 62 are configured to be frangible when the containment ring 34 is impacted with disc fragments during a fracture event. Still further and in one non-limiting embodiment, the tabs 62 are integrally formed with the main body portion 39 of the containment ring 34 so that they (e.g., the main body portion 39) and the flange portion 48 form a single unitary structure.

Figure 8:
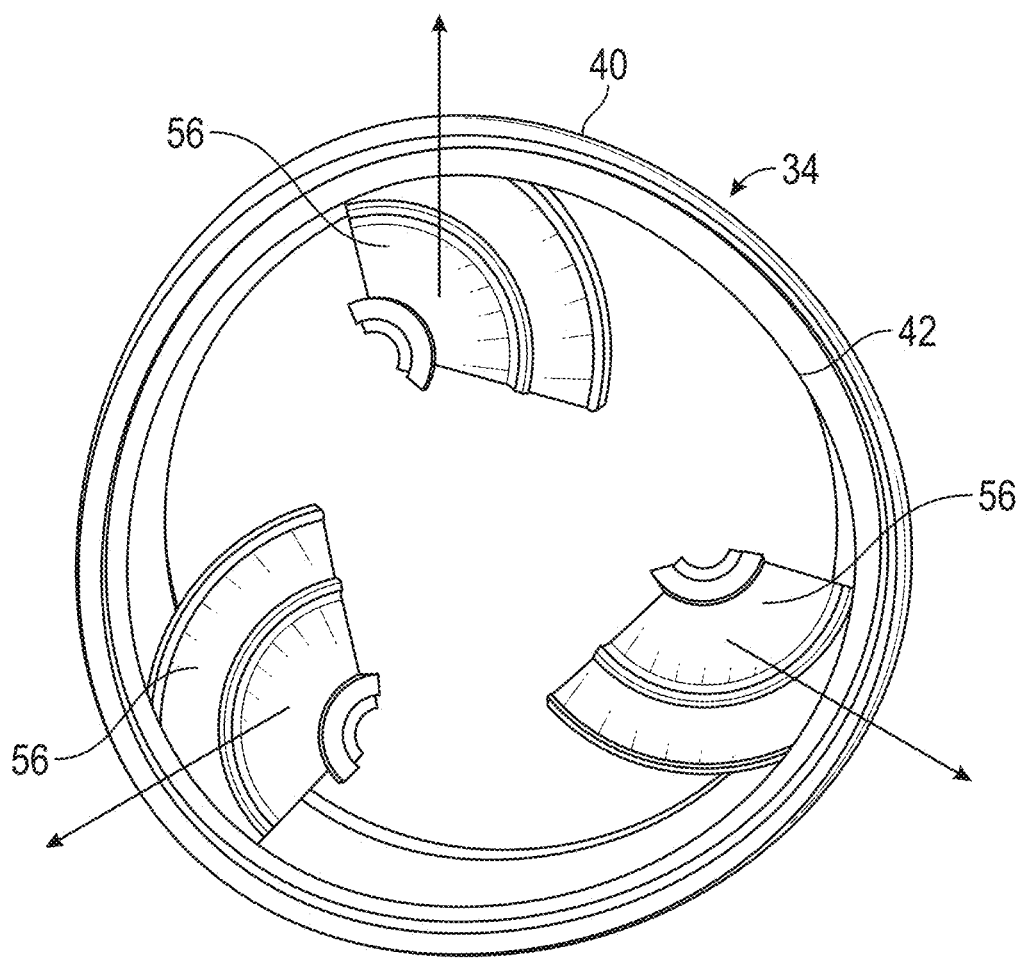
FIG. 8 is an illustration of containment of a rotor by the containment ring in accordance with the present disclosure.

FIG. 8 is an illustration of containment of portions 56 of the rotor 36 by the containment ring 34 in accordance with the present disclosure.

In accordance with the present disclosure, the containment ring 34 architecture with a ribbed inner portion and solid outer portion is provided in order to maximize flexibility and energy absorption of the containment ring 34 in particular during a tri-hub fracture event of the rotor 26.

For example and in an uncontrolled overspeed event, rotating parts (turbine discs, compressor rotor, impeller, etc.) can fracture in three parts (tri-hub) and the high energy fragments are contained by the containment ring 34. See for example, FIG. 8. As such and in accordance with the present disclosure, these fragments are contained using the containment ring 34 of the present disclosure.

When the fragment(s) 56 hit(s) the ring 34, the kinetic energy (KE) is absorbed by the potential energy of the ring (PE) in particular, the inner portion or inner containment zone 52 (e.g., ribs 54) which deform upon impact. As such, the inner portion or inner containment zone 52 with its ribs 54 and openings 58 causes the inner portion or inner containment zone 52 to be more flexible and plastically deform locally at an impact point which also maximizes the containment ring's 34 energy absorption. Thus, the inner portion or inner containment zone 52 acts as the energy-absorbing sacrificial zone whereas the outer portion or outer containment zone 50 contains the fragments and prevents them from being released outside the outer structural case 32.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A containment ring for a turbine casing assembly, comprising:
a main body portion, the main body portion having an outer periphery and an inner periphery and a forward end and an aft end each extending between the outer periphery and the inner periphery, the main body portion having a center axis and also including an outer containment zone and an inner containment zone, the inner containment zone is integrally formed with the outer containment zone in order to provide a single unitary structure and the inner containment zone being radially inward from the outer containment zone, the inner containment zone extending radially outward from the inner periphery and having a plurality of ribs, each of the plurality of ribs extending continuously from the forward end and the aft end and each of the plurality of ribs being substantially parallel to the center axis, wherein the plurality of ribs are each separated by an opening extending into the inner periphery, the opening does not extend to the outer periphery or the forward end or the aft end and each of the plurality of ribs have opposing surfaces that are anularly offset in the same direction with respect to the inner periphery of the containment ring and to a plane extending radially from the center axis.

2. The containment ring as in claim 1, wherein the plurality of ribs are equally spaced from each other.

3. The containment ring as in claim 1, further comprising a flange portion secured to the main body portion.

4. The containment ring as in claim 3, wherein the flange portion is secured to the main body portion via a plurality of tabs.

5. The containment ring as in claim 1, wherein the main body portion is circular in shape.

6. The containment ring as in claim 1, wherein the opening extends from the inner periphery and has a scalloped shape.

7. The containment ring as in claim 1, wherein the opening has an inner surface that is furthest from the inner periphery at a central portion of the opening and a depth of the opening from the inner periphery gradually decreases as it extends from the central portion towards the forward end or the aft end.

8. The containment ring as in claim 7, wherein the opening has a curved bottom surface that extends from the central portion towards the forward end and the aft end of the main body portion.

9. The containment ring as in claim 1, wherein an axial length of the inner periphery from the forward end to the aft end is greater than an axial length of the outer periphery from the forward end to the aft end.

10. The containment ring as in claim 1, wherein the main body portion has a trapezoidal shape in its cross section.

11. The containment ring as in claim 1, wherein the forward end and the aft end are angled surfaces that extend towards each other from the inner periphery.

12. A turbine casing assembly, comprising:
an outer structural case; and
a containment ring, comprising: a main body portion, the main body portion having an outer periphery and an inner periphery and a forward end and an aft end each extending between the outer periphery and the inner periphery, the main body portion having a center axis and also including an outer containment zone and an inner containment zone, the inner containment zone is integrally formed with the outer containment zone in order to provide a single unitary structure and the inner containment zone being radially inward from the outer containment zone, the inner containment zone extending radially outward from the inner periphery and having a plurality of ribs, each of the plurality of ribs extending continuously from the forward end and the aft end and each of the plurality of ribs being substantially parallel to the center axis, wherein the plurality of ribs are each separated by an opening extending into the inner periphery, the opening does not extend to the outer periphery or the forward end or the aft end and each of the plurality of ribs have opposing surfaces that are angularly offset in the same direction with respect to the inner periphery of the containment ring and to a plane extending radially from the center axis.

13. A gas turbine engine, comprising:
a compressor section;
a combustor;
a turbine section; and
a turbine casing assembly, comprising:
an outer structural case; and
a containment ring, comprising: a main body portion, the main body portion having an outer periphery and an inner periphery and a forward end and an aft end each extending between the outer periphery and the inner periphery, the main body portion having a center axis and also including an outer containment zone and an inner containment zone, the inner containment zone is integrally formed with the outer containment zone in order to provide a single unitary structure and the inner containment zone is radially inward from the outer containment zone, the inner containment zone extending radially outward from the inner periphery and having a plurality of ribs, each of the plurality of ribs extending continuously from the forward end and the aft end and each of the plurality of ribs being substantially parallel to the center axis, wherein the plurality of ribs are each separated by an opening extending into the inner periphery, the opening does not extend to the outer periphery or the forward end or the aft end and each of the plurality of ribs have opposing surfaces that are angularly offset in the same direction with respect to the inner periphery of the containment ring and to a plane extending radially from the center axis.

* * * * *